United States Patent [19]

Long

[11] Patent Number: 4,879,564

[45] Date of Patent: Nov. 7, 1989

[54] ULTRASONIC DYE IMAGE FUSING

[75] Inventor: Michael E. Long, Fairport, N.Y.

[73] Assignee: Eastman Kodak Company, Rochester, N.Y.

[21] Appl. No.: 305,263

[22] Filed: Feb. 2, 1989

[51] Int. Cl.[4] .......... G01D 15/00

[52] U.S. Cl. .......... 346/25; 156/73.1; 219/216; 346/76 R; 430/3

[58] Field of Search .......... 346/1.1, 76 R, 140, 346/139 R, 25, 76 PH; 430/3; 156/73.1; 219/216; 34/1

[56] References Cited

U.S. PATENT DOCUMENTS

| | | | |
|---|---|---|---|
| 3,022,814 | 2/1962 | Bodine | 156/73.1 |
| 3,907,089 | 9/1975 | Montoya | 346/1.1 X |
| 4,046,073 | 9/1977 | Mitchell | 346/1.1 X |
| 4,086,112 | 4/1978 | Porter | 156/73.1 |
| 4,541,042 | 9/1985 | Kohashi | 346/76 PH |
| 4,751,529 | 6/1988 | Elrod | 346/140 |
| 4,796,036 | 1/1989 | Misono | 346/108 |

OTHER PUBLICATIONS

Proceedings of 7th Symposium on Ultrasonic Electronics, Kyoto 1986 Japanese Journal of Applied Physics, vol. 26 (1987) Supplement 26-1, pp. 141-143.

Quate, The Acoustic Microscope: A Concept for Microscopy Using Waves of Sound, NR Review (1980/1981).

*Primary Examiner*—Joseph W. Hartary

*Attorney, Agent, or Firm*—Raymond L. Owens

[57] ABSTRACT

A thermal printer is disclosed in which ultrasonic energy is converted to heat a dye image in a receiver to cause such dye to fuse into such receiver.

4 Claims, 1 Drawing Sheet

ULTRASONIC DYE IMAGE FUSING

CROSS REFERENCE TO RELATED APPLICATION

Reference is made to commonly assigned U.S. patent application Ser. No. 222,650 filed July 21, 1988 to DeBoer and Long.

BACKGROUND OF THE INVENTION

1. Field of the Invention

The present invention relates to thermal printers which use ultrasonic energy to fuse dye into a receiver.

2. Description of the Prior Art

Currently, thermal dye transfer is usually followed by fusing to further "set" the dye into the receiver layer and immobolize it in the mordant. The term thermal dye transfer refers to all methods of transferring dye by thermal methods irregardless whether the thermal energy is directly or indirectly generated and/or delivered, such as, but not inclusively, resistive head, resistive ribbon, laser and ultrasonic thermal dye transfer. There are two technologies available for fusing; thermal and solvent fusing. The former, which is most often used consists of reheating the receiver after thermal dye transfer. Because this technique uses thermal energy and generates a large amount of heat, generally a separate unit, isolated from the heat sensitive donor, is required to perform this operation. This then requires a distinct two step process and two units, one for image transfer and one for fusing, which in turn increases time and cost of thermal imaging.

Another technique consists of exposing the image to solvent vapors after thermal dye transfer. This technique has several drawbacks which include fire hazard, toxicity and ventilation requirements of working with solvent vapors.

SUMMARY OF THE INVENTION

It is an object of this invention to provide an improved thermal printer system which efficiently fuses wax transfer or sublimable dyes in a receiver.

This object is achieved in a thermal printing system in which after dye is applied to a receiver, to form a dye image ultrasonic transmission means focuses ultrasonic energy at a position in or near the receiver to heat the receiver to fuse the dye image into the receiver.

Features and advantages of the invention include dye fused by focused ultrasonic action produces very little wasted heat, so there are less problems of thermal distortion.

DETAILED DESCRIPTION OF THE PREFERRED EMBODIMENT

Figure 1:
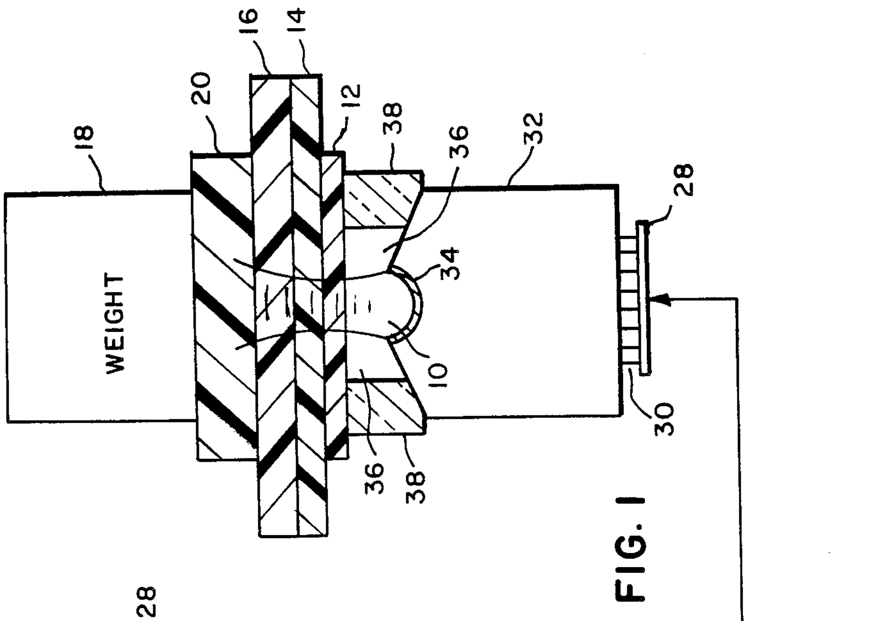
FIG. 1 is a block diagram which illustrates an ultrasonic fuser in accordance with the invention.
Figure 1:
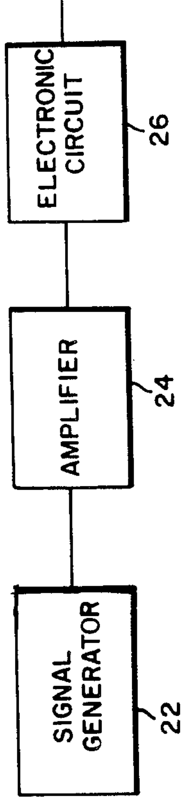

In accordance with invention, focused ultrasonic energy heats a receiver layer either directly or indirectly to fuse an image into the receiver. As illustrated in FIG. 1., an ultrasonic beam 10 is focused into a heat transfer layer 12 which in turn is in contact with dye receiver layer 14. The dye receiver layer 14 contains a dye image (not shown) and has been coated on a dye receiver support layer 16. A weight 18 helps maintain close contact between the heat transfer layer 12 and the dye receiver layer 14 and is thermally isolated by an insulation layer 20. The beam 10 passes through all sandwiched materials into layer 20.

The ultrasonic beam is produced as follows. A signal generator 22 produces a signal between 1 and 500 Hz. This signal is amplified by a broadband amplifier 24. The amplified signal is sent to electronic circuit 26 (see FIG. 2) and transducer 28. Various types of commercially available transducers can be used in accordance with this invention. An adhesion layer 30 bonds the transducer 28 to an ultrasonic lens 32 which focuses the ultrasonic beam 10 into the heat transfer layer 12. Lens materials which can be used are quartz, fused silica, sapphire, flint or crown glass, aluminum, brass, steel, and plastics such as polyethylene or polymethylmethacrylate. In selecting the adhesion layer 30, it is advantageous to have one whose acoustic impedance, the produce of the velocity of sound in the material and its density is between that of the transducer and the lens so as to maximize the acoustic transmission from the transducer to the lens. It is also important that acoustic absorption in the frequency range of interest be minimized in the lens 32 so that most of the energy is transferred into the receiver 14. Other acoustic materials for transmission and/or ultrasonic energy controlling elements can also be selected using these well-known acoustic criteria.

Preferably, a quarterwave acoustic impedance matching layer 34 is used to improve the match of acoustic impedance between the lens 32 and an acoustic coupling fluid 36. The purpose of the impedance coupling or matching fluid 36 is to increase the transmission of the ultrasonic energy through the lens 32, and into the heat transfer layer 12. While in a particular embodiment, the ultrasonic beam was focused into the heat transfer layer 12, the beam could be focused directly into the dye receiver layer 14 or the dye receiver support layer 16 by adjusting the thickness of the spacer 38 and/or to a lesser degree, the amount of coupling fluid 36. Maximum heating and fusing occurs at a frequency which is in resonance with the thickness of the heating layer 12 as is well known in the art. However, the same effect could be realized by tuning the ultrasonic frequency to an ultrasonic absorption in the layer 12, the dye receiver layer 14 and/or the dye receiver support layer 16.

Figure 2:
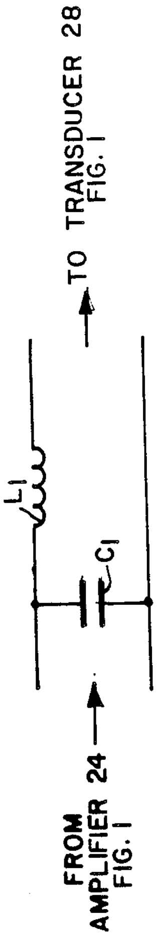
FIG. 2 is schematic circuit diagram of a block in FIG. 1.

FIG. 2 shows in more detail the electronic circuit of the block 26 of FIG. 1. The circuit is comprised of a capacitor $C_1$ in parallel with inductor $L_1$. The purpose of this circuit is to improve the impedance match between the amplifier 24 and the transducer 28shown in FIG. 1 as will be well understood to those skilled in the art.

The present invention is suitable for use in wax transfer systems in which dye is contained in a wax matrix. When the wax is heated, it melts and an image pixel is transferred to the receiver. However, sublimable dyes are preferable.

Any sublimable dye can be used provided it has been transferred into the dye image-receiving layer of the invention by the action of heat. Especially good results have been obtained with sublimable dyes. Examples of sublimable dyes include anthraquinone dyes, e.g., Sumikalon Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM ® and KST Black 146 ® (products of Nippon Kayaku Co., Ltd.), azo dyes such as Kayalon Polyol Brilliant Blue BM ®, Kayalon Polyol Dark Blue 2BM ®, and KST Black KR ® (products of Nippon Kayaku Co., Ltd.), Sumickaron Diazo Black 5G ® (product of Sumitomo Chemical Co., Ltd.), and Miktazol Black 5GH ® (product of Mitsui Toatsu Chemicals, Inc.); direct dyes such as Direct Dark Green B ® (product of Mitsubishi Chemical Industries, Ltd.) and Direct Brown M ® and Direct Fast Black D ® (products of Nippon Kayaku Co., Ltd.); acid dyes such as Kayanol Milling Cyanine 5R ® (product of Nippon Kayaku Co., Ltd.); basic dyes such as Sumicacryl Blue 6G ® (product of Sumitomo Chemical Co., Ltd.), and Aizen Malachite Green ® (product of Hodogaya Chemical Co., Ltd.); or any of the dyes disclosed in U.S. Pat. No. 4,541,830, the disclosure of which is hereby incorporated by reference.

The dye receiver layer 14 can be a commercially available polycarbonate or polyester which is capable of having a dye thermal transferred and fused into it and can be coated on a dye support layer 16 such as paper.

The heat transfer layer 12 can consist of any continuous nonfiborous polymeric material such as polyethylene, polycarbonate or polyester.

EXAMPLE

In an example according to this invention, unfused cyan and magenta dye were formed in a receiver in a conventional manner. These images were then exposed to ultrasonic energy for several seconds and then washed in a 10% solution of HCL. The unfused area was washed off.

A Hewlett-Packard FG502 11 Mhz Function Generator set at a nominal 5 Mhz was used as the signal generator 22, and the amplifier 24 was an IntraAction Corporation Model PA-4 RF Power Amplifier. The capacitor $C_1$ from FIG. 2 was 352 pf and the inductor $L_1m$ was 2.85 $\mu$H. The piezoelectric transducer 28 was a Valpey Fisher Lead Methaniobate transducer with a 5 Mhz resonance frequency. The adhesive 30 was LOCTITE Super Binder 495 and the impedance coupling fluid 36 was Castor oil. The lens 28 was a 12 mm thick plano-concave flint glass lens with a radius of curvature of 2.5 mm without the preferred quarterwave plate 34. A 40°–45° C., 0.22 mm liquid crystal from Edmund Scientific was used as the heat transfer layer 12 which also aided in the adjustment to the resonance heating frequency. The insulation layer 20 was 3 mm thick rubber and the weight 18 was a 100 g brass weight.

Other improvements can be realized, for example, by matching the impedance and frequency ranges of the electronic components with each other and through various impedance matching circuits with the transducer. Those skilled in the art will recognize that the selection of materials for production of ultrasonic energy, its control and focusing can be optimized so as to maximize impedance matching and to minimize ultrasonic absorption at a particular frequency. For example, using a lens made from a plastic material whose ultrasonic impedance in certain instances can more closely match that of the adhesive and coupling fluid. Material selection for the elements would include the transducer, adhesives, lens quarterwave plate (or using two), coupling fluid, dye support layer, as well as the thickness of the dye support and dye layers.

The invention has been described in detail with particular reference to certain preferred embodiments thereof, but it will be understood that variations and modifications can be effected within the spirit and scope of the invention.

I claim:

1. In a thermal printing system in which a dye image is formed in a receiver, the improvement comprising:
- ultrasonic transmission means for focussing ultrasonic energy at a position in or near the receiver to heat the receiver to fuse the dye image into the receiver.

2. The invention of claim 1 wherein the frequency of the ultrasonic thermal energy is in a frequency range of from about 1 to 500 MHz.

3. In a thermal printing system in which a dye image was sublimed and transferred into a receiver, the improvement comprising:
- ultrasonic transmission means for transmitting ultrasonic energy in a frequency range of from about 1 to 500 Mhz; and
- lens means including a lens for receiving ultrasonic energy from said ultrasonic transmission means for focusing such energy at a portion in or near the receiver to heat the receiver and cause the dye image to fuse into the receiver.

4. The invention as set forth in claim 3, wherein said lens means is selected from the group consisting of quartz, fused silica, sapphire, flint or crown glass, aluminum, brass, steel and plastics such as polyethylene or polymethylmethacrylate.

* * * * *